Patented Jan. 10, 1939

2,143,324

UNITED STATES PATENT OFFICE 2,143,324

DIURETIC COMPOSITION

John C. Krantz, Jr., Baltimore, Md., assignor to Hynson, Westcott & Dunning, Incorporated, Baltimore, Md., a corporation of Maryland No Drawing. Application July 7, 1938,
Serial No. 218,021

1 Claim. (Cl. 167—65)

This invention relates to the use of iso-mannide as a therapeutic agent, particularly as a diuretic.

Iso-mannide is known and may be prepared by known methods. So far as I am aware, however, its physiological properties have not heretofore been investigated, nor has the compound been applied for therapeutic purposes, nor has its utility as a diuretic agent been suspected or predicted. Its formula is generally accepted to be as follows:

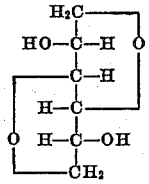

Its melting point is 87° C.

I have discovered that this compound possesses physical, chemical and physiological properties which admirably fit it for use as a diuretic.

The compound is suitable for therapeutic use with respect to its physical and chemical properties, i. e., it is a crystalline stable solid, practically odorless and readily soluble in water and other usual vehicles and in body fluids. Solutions in water are indefinitely stable, showing no decomposition on long standing. Solutions may be heat sterilized. Iso-mannide is non-toxic and non-irritating to animal tissues. It is readily absorbed from the alimentary tract and its sojourn in the blood is not deleterious to the elements of the blood. It is excreted unchanged by the kidney and owing to its property of increasing the effective glomerular filtration pressure, thereby greatly increasing the urine output, it is valuable as a diuretic.

Iso-mannide, in fact, possesses all of the requirements of a diuretic. It may be administered by mouth or by intravenous injection, possesses enormous water binding capacity and is determinable in blood plasma or urine with quantitative accuracy. Because of its low molecular weight, it exhibits many times the osmotic pressure of most other diuretics.

These properties above referred to have been demonstrated by proper pharmacological and clinical experiments. For example, appropriate experiments have shown iso-mannide to be without effect on the metabolism of white rats. It does not raise the respiratory quotient, nor the blood sugar level. Large doses do not diminish the oxygen consumption or show any toxic symptoms. Dosages of 2 grams per 100 grams of body weight of rats (equivalent to 3 pounds per 145 pound man) show no demonstrable effects other than those attributed to its diuretic action. Upon autopsy after prolonged feeding experiments using rats, no pathological changes of the kidney, liver or other organs are detectable. I have further demonstrated that intravenous injections of 1.25 grams per kilogram in dogs produced no changes in respiration or blood pressure, but did produce a marked diuresis.

Furthermore, experiments in man show that 10 grams of iso-mannide given by mouth produce no physiological effect other than a marked diuresis. The urine output is increased from 20% to 50% or more. Approximately 80% of the ingested iso-mannide is excreted unchanged by the kidney within twenty-four hours.

This compound is, therefore, a powerful diuretic, producing this physiological effect presumably by virtue of its peculiar physico-chemical properties. It may be given by mouth or by injection in copious quantities. Its use is indicated in the treatment of edema of cardiac or renal origin, for the reduction of cerebrospinal fluid pressure, for the lowering of intra-ocular tension in glaucoma, for the relief of pulmonary edema and for other conditions where the removal of excess water from the tissues is desired.

Iso-mannide may be applied in various forms, e. g., in solution orally or intravenously, or orally in solid forms such as tablets. For use as a diuretic it is preferable in the form of a water elixir, or in ampules for purpose of injection.

I claim:

A diuretic composition comprising as the active diuretic agent iso-mannide.

JOHN C. KRANTZ, JR.